United States Patent
Deshpande et al.

(10) Patent No.: US 10,937,409 B2
(45) Date of Patent: Mar. 2, 2021

(54) PREDICTIVE ACOUSTIC ECHO CANCELLATION

(71) Applicant: KNOWLES ELECTRONICS, LLC, Itasca, IL (US)

(72) Inventors: Murali Mohan Deshpande, Karnataka (IN); Harinarayanan Erumbi Vallabhan, Karnataka (IN)

(73) Assignee: Knowles Electronics, LLC, Itasca, IL (US)

(*) Notice: Subject to any disclaimer, the term of this patent is extended or adjusted under 35 U.S.C. 154(b) by 0 days.

(21) Appl. No.: 16/678,339

(22) Filed: Nov. 8, 2019

(65) Prior Publication Data

US 2020/0152167 A1  May 14, 2020

Related U.S. Application Data

(60) Provisional application No. 62/757,281, filed on Nov. 8, 2018.

(51) Int. Cl.
*G10K 11/178* (2006.01)
*H04M 9/08* (2006.01)

(52) U.S. Cl.
CPC .. *G10K 11/17854* (2018.01); *G10K 11/17881* (2018.01); *G10K 2210/3028* (2013.01); *G10K 2210/505* (2013.01)

(58) Field of Classification Search
None
See application file for complete search history.

(56) References Cited

U.S. PATENT DOCUMENTS

| 5,680,450 A * | 10/1997 | Dent | H04M 9/082 |
| | | | 379/406.08 |
| 6,738,482 B1 * | 5/2004 | Jaber | H04R 1/406 |
| | | | 379/406.01 |
| 7,480,377 B2 * | 1/2009 | Bershad | H04B 3/23 |
| | | | 370/286 |
| 8,189,766 B1 | 5/2012 | Klein | |
| 8,259,926 B1 | 9/2012 | Avendano et al. | |
| 8,355,511 B2 | 1/2013 | Klein | |

(Continued)

*Primary Examiner* — Qin Zhu
(74) *Attorney, Agent, or Firm* — Foley & Lardner LLP

(57) ABSTRACT

A method for echo cancellation based on microphone signal correlation is disclosed. The method includes replaying a reference signal by a speaker; collecting a primary audio signal by a primary microphone and a secondary audio signal by a secondary microphone based on the reference signal being replayed; partitioning the reference signal into a plurality of sectioned reference signals, based on levels of correlation between the primary audio signal and the secondary audio signal; generating a plurality of sectioned primary echo signals for the primary microphone by processing the sectioned reference signals by an acoustic audio canceller (AEC); generating a plurality of sectioned secondary echo signals for the secondary microphone by processing the sectioned reference signals by a predictive acoustic audio canceller (AEC-P), wherein the AEC-P generates at least one of the sectioned secondary echo signals based on a corresponding sectioned primary echo signal; and performing echo cancellation for the secondary microphone by removing a combination of the sectioned secondary echo signals from the secondary audio signal.

20 Claims, 14 Drawing Sheets

(56) References Cited

U.S. PATENT DOCUMENTS

| | | |
|---|---|---|
| 8,472,616 B1 | 6/2013 | Jiang |
| 10,045,122 B2 | 8/2018 | Shah et al. |
| 2011/0255703 A1* | 10/2011 | Jansse .................. H04M 9/082 |
| | | 381/66 |
| 2012/0163615 A1* | 6/2012 | Li ........................ H04M 9/082 |
| | | 381/71.1 |
| 2012/0250872 A1* | 10/2012 | LeBlanc ................. H04R 3/02 |
| | | 381/71.1 |
| 2014/0003635 A1* | 1/2014 | Mohammad ........... G10K 11/16 |
| | | 381/306 |
| 2014/0119552 A1* | 5/2014 | Beaucoup ............. H04M 9/082 |
| | | 381/66 |
| 2015/0078564 A1* | 3/2015 | Guo ................... G10L 21/0208 |
| | | 381/66 |
| 2015/0381821 A1* | 12/2015 | Kechichian ........... H04M 3/002 |
| | | 381/93 |

\* cited by examiner

White Noise

AEC and AEC-P ERLE (dB) values

| ERLE(dB) | MIC_1 | MIC_2 | MIC_3 | MIC_4 | MIC_5 | MIC_6 | MIC_7 | MIC_8 |
|---|---|---|---|---|---|---|---|---|
| AEC | 14.5737 | 14.8034 | 14.8981 | 14.7436 | 14.4044 | 14.8157 | 14.9313 | 14.6359 |
| AEC-P | 14.5737 | 11.09 | 14.8981 | 10.9 | 14.4044 | 10.96 | 14.9313 | 11.7 |
| Diff | 0 | -3.71 | 0 | -3.84 | 0 | -3.85 | 0 | -2.93 |

*Note: Mic 1,3,5,7 are primary channels for Mic 2,4,6,8 (secondary channels) respectively.
Primary channels run full complexity AEC

FIG. 11

Music

AEC and AEC-P ERLE (dB) values

| ERLE(dB) | Mic_1 | Mic_2 | Mic_3 | Mic_4 | Mic_5 | Mic_6 | Mic_7 | Mic_8 |
|---|---|---|---|---|---|---|---|---|
| AEC | 14.6184 | 14.5817 | 14.2149 | 15.3842 | 15.0267 | 12.4349 | 13.0403 | 14.1178 |
| AEC-P | 14.6184 | 12.24 | 14.2149 | 12.14 | 15.0267 | 11.82 | 13.0403 | 10.95 |
| Diff | 0 | -2.34 | 0 | -3.24 | 0 | -0.61 | 0 | -3.16 |

*Note: Mic 1,3,5,7 are primary channels for Mic 2,4,6,8 (secondary channels) respectively.
Primary channels run full complexity AEC

FIG. 12

Speech

AEC and AEC-P ERLE (dB) values

| ERLE(dB) | MIC_1 | MIC_2 | MIC_3 | MIC_4 | MIC_5 | MIC_6 | MIC_7 | MIC_8 |
|---|---|---|---|---|---|---|---|---|
| AEC | 15.5072 | 16.4171 | 16.5854 | 16.3309 | 15.6342 | 15.2834 | 14.3588 | 14.6735 |
| AEC-P | 15.5072 | 12.20 | 16.5857 | 12.87 | 15.6342 | 11.81 | 14.3588 | 10.95 |
| Diff | 0 | -4.21 | 0 | -3.46 | 0 | -3.47 | 0 | -3.7 |

*Note: Mic 1,3,5,7 are primary channels for Mic 2,4,6,8 (secondary channels) respectively.
Primary channels run full complexity AEC

FIG. 13

| | Filtering: Additions | Filtering: Multiply | Filter Update: Additions | Filter Update: Multiply | Total |
|---|---|---|---|---|---|
| AEC | 23*256 | 24*256 | (256*25+128)*8 | 256*26*8 | 117504 |
| AEC-P | 24*256 | 20*256 | (256*25+128)*4 | 256*26*4 | 64000 |
| | | | | % Savings | 45.53% |

Savings for one secondary channel: AEC-P Vs AEC @ 16000Hz

FIG. 14

PREDICTIVE ACOUSTIC ECHO CANCELLATION

CROSS-REFERENCE TO RELATED APPLICATIONS

This application claims the benefit of and priority to U.S. Provisional Patent Application No. 62/757,281, filed Nov. 8, 2018, the entire contents of which are incorporated herein by reference.

TECHNICAL FIELD

This present embodiments relate generally to audio processing and more particularly to acoustic echo cancellation.

BACKGROUND

When using a communication device, such as a mobile phone, a hearable device such as a smart speaker, or an internet-of-things (IoT) device, to communicate with a far-end source, echo may develop during the communication. For example, when audio from a far-end environment is output through a speaker of a near-end communication device (e.g., a mobile phone, a hearable device, or an IoT device), the far-end audio signal which is output locally by the speaker may be picked up by microphones or other audio sensors of the near-end communication device. As such, the sounds from the far-end audio signal may be sent back to the far-end environment with a delay, resulting in an echo to a far-end listener.

Moreover, communication devices (e.g., mobile phones, hearable devices, or IoT devices) may include multiple speakers as channels for audio playback and multiple microphones for improved voice user interfaces and voice communications. Although the multiple microphones enhance natural voice interaction experiences on the devices, each microphone picks up a different version of the locally played far-end audio signal due to the different placement locations of the microphones on the device. Thus, the configuration of multiple microphones further increases complexity of the echo problem.

SUMMARY

In some embodiments, a method for echo cancellation comprises receiving a reference signal; receiving a primary echo signal from a primary microphone and a secondary echo signal from a secondary microphone corresponding to the reference signal; partitioning the reference signal into a plurality of sectioned reference signals, wherein each of the plurality of sectioned reference signals corresponds to a respective number of filter taps; generating a plurality of sectioned primary predicted echo signals for the primary microphone by processing the sectioned reference signals using an acoustic audio canceller (AEC); generating a plurality of sectioned secondary predicted echo signals for the secondary microphone by processing the sectioned reference signals using a predictive acoustic audio canceller (AEC-P), wherein the AEC-P generates at least one of the sectioned secondary predicted echo signals based on a corresponding sectioned primary predicted echo signal; and performing echo cancellation for the secondary microphone by removing the sectioned secondary predicted echo signals from the secondary echo signal.

In some embodiments, a method for echo prediction comprises receiving a primary echo signal collected from a primary microphone and a secondary echo signal collected from a secondary microphone, corresponding to a reference signal that is provided for rendering into an audio signal by a speaker; partitioning the reference signal into a plurality of sectioned reference signals; generating a plurality of sectioned primary predicted echo signals based on the sectioned reference signals of an acoustic audio canceller (AEC); generating a plurality of sectioned secondary predicted echo signals respectively by echo filters of a predictive acoustic audio canceller (AEC-P) based on the sectioned reference signals, wherein at least one of the sectioned secondary predicted echo signals is generated by one of the echo filters of AEC-P using a corresponding sectioned primary predicted echo signal as input, and wherein each of the respective echo filters has a different level of computational complexity; and cancelling echo for the secondary microphone by combining the sectioned secondary predicted echo signals with the secondary echo signal.

In some embodiments, an electronic device with echo cancellation comprises a speaker configured to render a reference signal for output as an audio signal; a primary microphone configured to collect a primary echo signal corresponding to the reference signal; a secondary microphone configured to collect a secondary echo signal corresponding to the reference signal; and a processor configured to perform a method including: partitioning the reference signal into a plurality of sectioned reference signals; generating a plurality of sectioned primary predicted echo signals for the primary microphone by processing the sectioned reference signals by an acoustic audio canceller (AEC); generating a plurality of sectioned secondary predicted echo signals for the secondary microphone by processing the sectioned reference signals by a predictive acoustic audio canceller (AEC-P), wherein the AEC-P generates at least one of the sectioned secondary predicted echo signals based on a corresponding sectioned primary predicted echo signal; and performing echo cancellation by removing the sectioned primary predicted echo signals from the primary echo signal and removing the sectioned secondary predicted echo signals from the secondary echo signal.

BRIEF DESCRIPTION OF THE FIGURES

FIG. 11 illustrates a comparison of echo cancellation performances between AEC and AEC-P for white noise signals, according to an exemplary embodiment;

FIG. 12 illustrates a comparison of echo cancellation performances between AEC and AEC-P for music signals, according to an exemplary embodiment;

FIG. 13 illustrates a comparison of echo cancellation performances between AEC and AEC-P for speech signals, according to an exemplary embodiment; and FIG. 14 illustrates a complexity analysis for AEC and AEC-P, according to an exemplary embodiment.

DETAILED DESCRIPTION

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

Acoustic Echo Cancellation

Acoustic echo may occur during a conversation between persons via a communication network. For instance, a far end signal representative of remote sounds (such as those generated by a far end speaker at a remote location) may be carried by the communication network to a near end communication device which may reproduce the remote sounds via a loudspeaker. These reproduced remote sounds may contribute a portion of local sounds making up a local sound environment (for example, in addition to speech of a near end speaker) and captured by the near end communication device for transmission via the communication network. Thus, the far end speaker may hear a delayed reproduction of their own speech and an acoustic "echo" may be said to exist.

Figure 1:
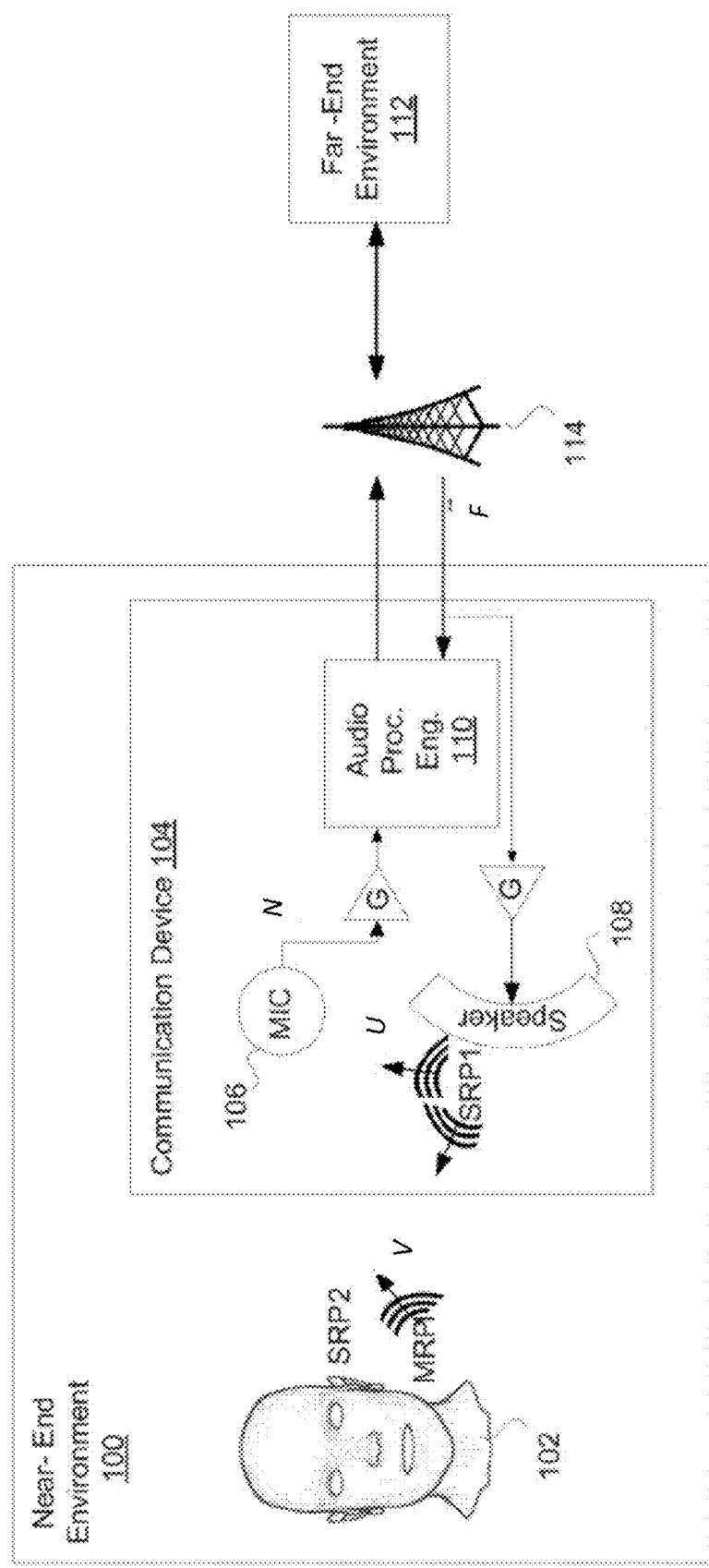
FIG. 1 illustrates an environment in which the audio processing system disclosed herein may be used, according to an exemplary embodiment.

Referring now to FIG. 1, an environment 100 in which various embodiments disclosed herein may be practiced is shown. A user in a near-end environment 100 acts as an acoustic source 102 to a communication device 104 (e.g., a mobile phone, a hearable device or smart speaker, an IoT device, etc.).

The exemplary communication device 104 comprises a plurality of microphones 106, a speaker 108 (or multiple speakers), and an audio processing system 110 including an acoustic echo cancellation mechanism. In some embodiments, a mouth of the acoustic source 102 (e.g., the user) is near the microphones 106 and an ear of the acoustic source 102 (e.g., the user) is near the speaker 108. The microphones 106 are configured to pick up audio from the acoustic source 102, but may also pick up noise from the near-end environment 100. The audio received from the acoustic source 102 will comprise a near-end microphone signal N, which will be sent back to a far-end environment 112.

A far-end signal F comprising speech from the far-end environment 112 may be received via a communication network 114 by the communication device 104. The received signal F may then be provided to the near-end environment 100 via the speaker 108 (or multiple speakers). The audio output from the speaker 108 may leak back into (e.g., be picked up by) the microphones 106. This leakage may result in an echo perceived at the far-end environment 112. Since the microphones 106 are disposed on different locations on the communication device 104, each microphone may pick up a different version of the locally played far-end audio signal F and can cause a different variation of the echo.

For each of the microphones 106, the exemplary audio processing system 110 is configured to remove U (which represent echoes of F) from N, while preserving a near-end voice signal V. In some embodiments, the echoes U include main echoes and residual echoes. The main echoes refer to acoustic signals that are output by the speaker 108 and then immediately picked up by the microphones 106. The residual echoes refer to acoustic signals that are output by the speaker 108, bounced (acoustically reflected) by objects in the near-end environment 100 (e.g., walls), and then picked up by the microphones 106.

In exemplary embodiments, the removal of U from N is performed without introducing distortion of V to a far-end listener. This may be achieved by applying one or more cancellation filters (i.e., echo filters) to the near end signal $\underline{N}$ that render the acoustic echo inaudible, as will be described in more detail below.

Figure 2:
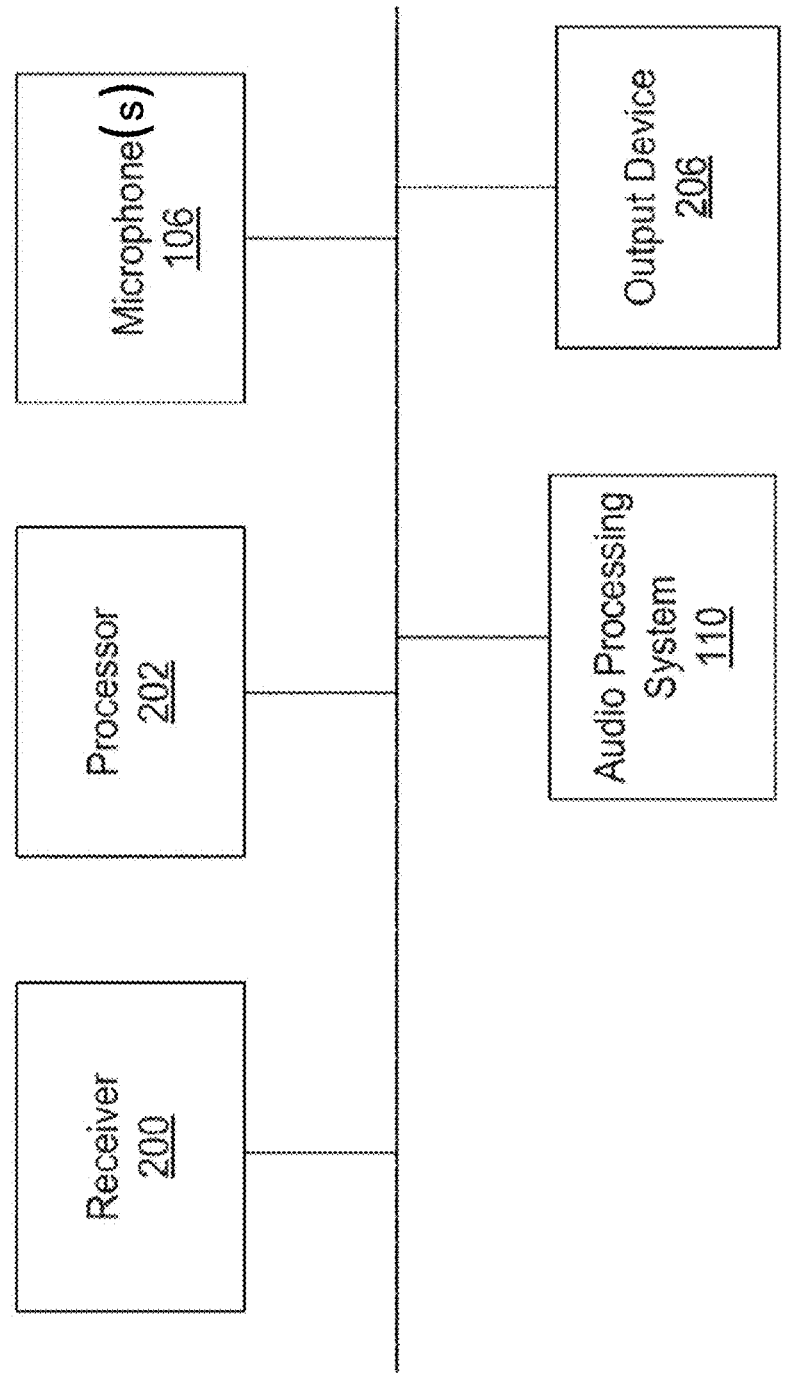
FIG. 2 illustrates a block diagram of an audio device including the audio processing system disclosed herein, according to an exemplary embodiment.

Referring now to FIG. 2, the exemplary communication device 104 is shown in further detail. In exemplary embodiments, the communication device 104 is an audio receiving device that comprises a receiver 200, a processor 202, the microphones 106, the audio processing system 110, and an output device 206. The communication device 104 may comprise more or other components necessary for operations of the communication device 104. Similarly, the communication device 104 may comprise fewer components that perform similar or equivalent functions to the components illustrated in FIG. 2.

Processor 202 may include one or more processors (e.g., CPUs) that may execute software stored in memory to partially or fully perform the AEC methods and operations discussed herein. In additional or alternative embodiments, processor 202 may also or instead perform other functions for the communication device 104 which are not necessarily related to the methodologies of the present embodiments.

The exemplary receiver 200 (e.g., a networking component) is configured to receive the far-end signal F from the network 114. The receiver 200 may be a wireless receiver or a wired receiver. In some embodiments, the receiver 200 may comprise an antenna device. The received far-end signal F may then be forwarded to the audio processing system 110 and the output device 206.

The audio processing system 110 can receive acoustic signals from the acoustic source 102 via the microphones 106 (e.g., acoustic sensors) and process the acoustic signals. After reception by the microphones 106, the acoustic signals may be converted into electric signals. The electric signals may be converted by, e.g., an analog-to-digital converter (not shown) into digital signals for processing in accordance with some embodiments. It should be noted that embodiments of the present technology may be practiced utilizing any number of microphones.

Output device 206 provides an audio output to a listener (e.g., the acoustic source 102). For example, output device 206 may comprise speaker 108, an earpiece of a headset, or handset on the communication device 104.

Predictive Acoustic Echo Canceller for Multiple Microphones

For each of the microphones 106, the audio processing system 110 of the communication device 104 may use an acoustic echo canceller (AEC) to cancel the echo arising from sound output by speaker 108. If each AEC performs independently, as the number of microphones 106 increases, the complexity of the echo cancellation increases, which complexity may exceed the capabilities of the limited computational resources of the communication device 104. The multiple AECs operating for echo cancellation of each of the microphones 106 may also increase an overall power consumed by the communication device 104.

Furthermore, certain types of communication devices 104, such as an IoT device, may have fairly long room impulse responses (e.g., 1024 or 2048 taps at 16 kHz sampling rate) as compared to other types of devices. The room impulse response (RIR) is a quantity that characterizes acoustic propagation from a sound source position to each of the device microphones 106. Herein, taps refer to the length of a filter (e.g., for room impulse response). In other words, the number of taps refers to the number of input samples (e.g., at 16 kHz sampling rate) over which the filter extends.

Thus, issues such as complexity and power consumption of multiple AECs and the long room impulse responses may lead to power and performance constraints on improving voice interface performance, particularly as the number of microphones 106 increases.

At least some aspects of the present disclosure describe a predictive AEC (also referred to as AEC-P) that reduces an overall complexity and power consumption of the communication device 104, compared to the multiple AECs for multiple microphones required by conventional approaches. As a result, more microphones can be placed on the communication device 104 (e.g., an IoT device) for a better voice interface performance.

In some embodiments, the predictive AEC processes microphones that have high correlations in echo signals present together. For example, microphones may be placed close together (e.g., a few centimeters apart such as less than 2 centimeters) such that the echo signals are highly correlated. One of the correlated microphones 106 can be selected as a primary microphone (also referred to as primary mic). A full AEC is used to estimate and cancel echo (referred to as primary echo) for the primary microphone. The acoustic echo captured by other correlated microphones, referred to as secondary echo (echo estimated for each secondary microphone), is estimated by sectioning the room impulse response of the secondary echo and modeling the sections differently.

Figure 3:
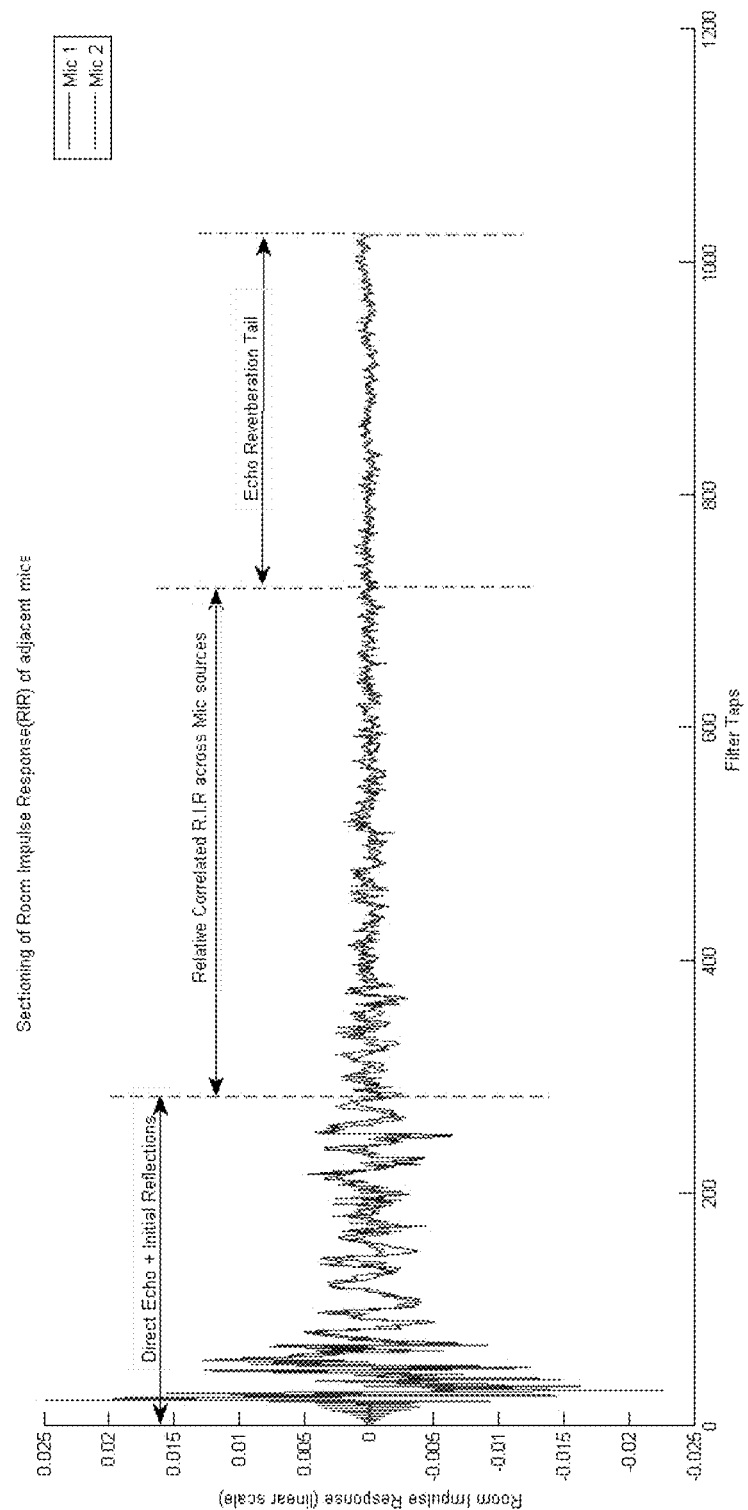
FIG. 3 illustrates sectioning of room impulse response of adjacent microphones, according to an exemplary embodiment.

For example, in some embodiments, the room impulse response of the secondary echo may be sectioned into three sections: section 1, section 2, and section 3. FIG. 3 illustrates sectioning of room impulse response of adjacent microphones. Although two microphones are illustrated in FIG. 3, the technology described herein can be applied to any number of microphones.

As illustrated in FIG. 3, the sectioning may be based on sound energy levels and/or correlation relationships of the microphones. The section 1 (also referred to as initial taps section) includes echo that has higher energy concentration and provides a relatively major contribution to the room impulse response. For example, the section 1 may include echo signals that are within 256 taps as shown in FIG. 3. Thus, an accurate modeling of the initial taps section is used for achieving a desired AEC performance. The section 1 echo may include direct echo (sound directly transmitted from the speaker to the microphone) and initial reflections (e.g., sound signals reflected once by a nearby surface such as a table top). The section 1 echo may be modeled using a full complexity AEC with a reduced tap length of 256 taps as compared to 1024 taps in conventional approaches The section 2 (also referred to as mid section, middle section, or middle taps section) may include echo signals that are from 256 taps to 768 taps as shown in the example of FIG. 3. Section 2 echo may include sound signals that are reflected from further away (e.g., reflected by far objects). As such, and as can be seen in FIG. 3, the echo signals in section 1 have a much higher energy contribution than the echo signals in section 2. A general aspect of AEC-P is that a secondary microphone's channel response can be modeled based on a neighboring primary microphone's room impulse response by virtue of this lower energy contribution. Thus, section 2 echo for the secondary microphone is modeled using a predictive AEC with a reduced tap length of 512 taps as compared to 1024 taps in conventional approaches, and utilizes predicted echo for the primary microphone.

The section 3 (also referred to as tail section, or tail taps section) includes echo for acoustic reverberation caused by environment from a distance (e.g., ceiling or wall). The section 3 echo includes echo reverberation tail, which models room reverberation that is very similar for the primary and secondary microphones. In other words, the RIR for section 3 is highly correlated (e.g., a correlation greater than about 0.7). Another general aspect of AEC-P is that a microphone's tail section can be modeled by borrowing a neighboring microphone's room impulse response due to this high correlation. Thus, the section 3 echo is modeled by reusing the predicted echo tail of the primary microphone as the echo tail of the secondary microphone as well. In other words, the predicted echo tails for the primary and secondary microphones are treated as being the same.

Since the echo is broken down into multiple sections and modeled in different ways, the overall complexity of the AEC applied to the whole set of microphones is reduced. Thus, the AEC-P is a linear modeling of echo using a combination of models for all three of the different sections of the room impulse response.

In some embodiments, a multidelay block frequency domain adaptive filter (MDF) can be used as an AEC in the frequency domain. In particular, MDF can be performed on signals of the primary microphone and also used as part of the AEC-P performed for predicting echo of the secondary microphones. In some alternative embodiments, the AEC-P can also be performed using frequency domain echo filters other than MDF and/or using echo filters in a time domain instead of a frequency domain.

Figure 4:
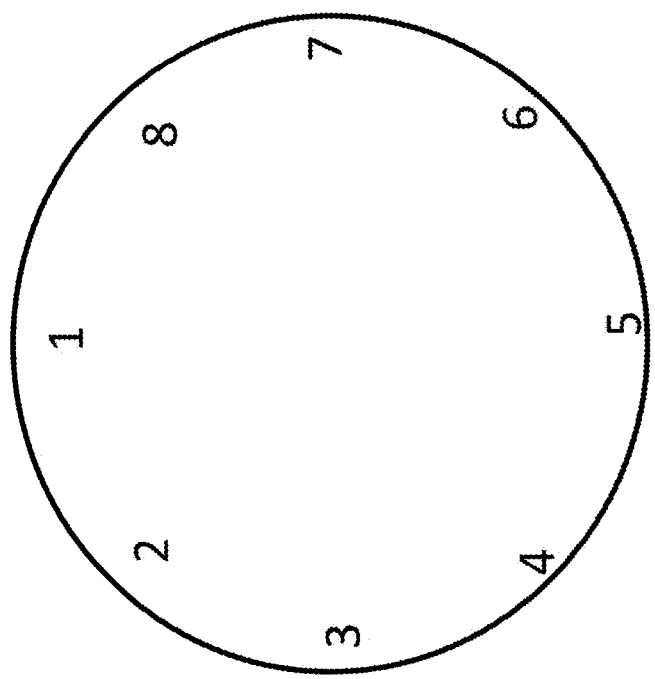
FIG. 4 illustrates a device including multiple pairs of primary and secondary microphones, according to an exemplary embodiment.

In some embodiments, multiple microphones can be used as primary microphones. FIG. 4 illustrates a device including multiple pairs of primary and secondary microphones. For example, 4 pairs of primary and secondary microphones are shown. The microphones #1, 3, 5 and 7 are used as the primary microphones respectively for the corresponding secondary microphones 2, 4, 6 and 8. In other embodiments, various numbers of microphones can be used as primary microphones and secondary microphones. According to some aspects, the pairs of microphones are selected so as to maximize a correlation between the RIR's of the primary and secondary microphones in the pairs as set forth above.

Figure 5:
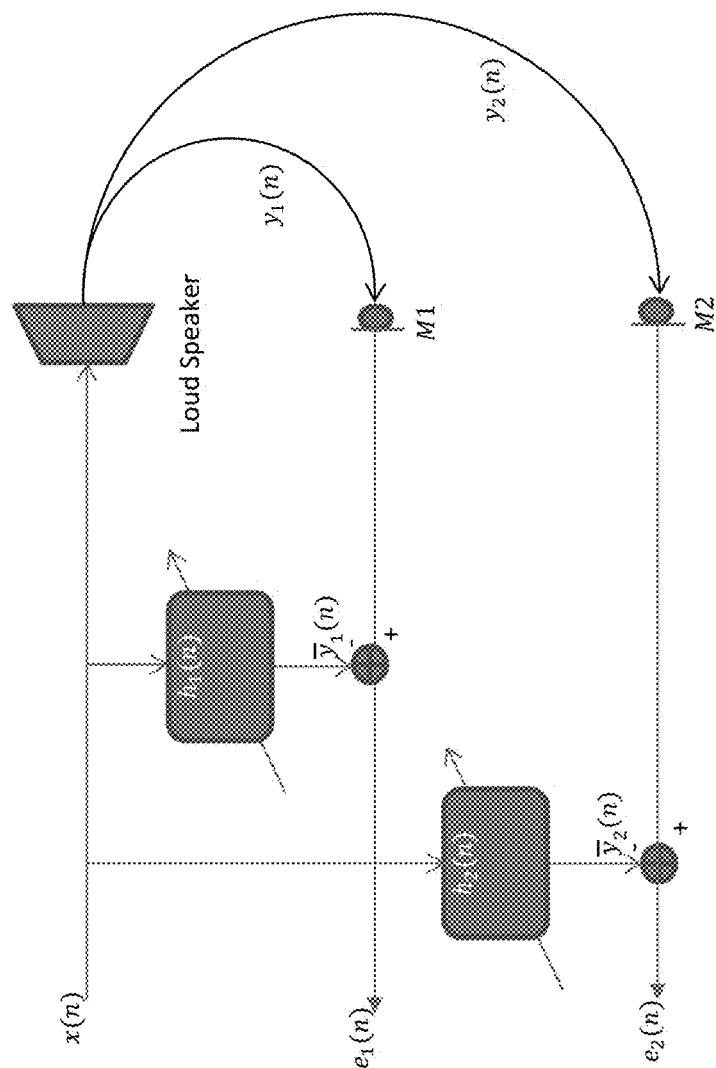
FIG. 5 is a flow diagram illustrating a conventional acoustic echo canceller (AEC) in a time domain.

FIG. 5 illustrates a conventional AEC in a time domain. As shown in FIG. 5, x(n) refers to n'th sample value of the AEC reference signal. In other words, x(n) represents the reference signal to be input for rendering by the speaker. $y_i(n)$ refers to n'th sample value (e.g., time index) of the echo signal captured at microphone $M_i$, where $i\epsilon(1,2)$ refers to the microphone index; e.g., 1 for primary microphone and 2 for secondary microphone. The echo signal includes both near and far end components.

$h_i(n)$ refers to an N-tap converged room impulse response (RIR) filter for microphone $M_i$, which predicts an echo signal based on the reference signal $x(n)$. $\bar{y}_i(n)$ refers to the n'th sample value of the predicted echo signal at microphone $M_i$, which is used to cancel the echo signal $y_i(n)$ captured by microphone $M_i$. In some embodiments, the predicted echo signal $\bar{y}_i(n)=x(n)\circledast h_i(n)$, where $\circledast$ is the convolution operator. In some embodiments, the coefficients of filter $h_i(n)$ may be iteratively estimated using, e.g., a normalized least mean squares (NLMS) algorithm.

After echo cancellation, the signal left (if any) is called residual error signal. $e_i(n)$ refers to n'th sample value of the residual error signal for microphone $M_i$, $e_i(n)=y_i(n)-\bar{y}_i(n)$. As shown in FIG. 5, the conventional AEC uses separate RIR filters that are performed for each of the microphones $M_i$ separately. In other words, the RIR filters for each microphone work independently from each other.

Figure 6:
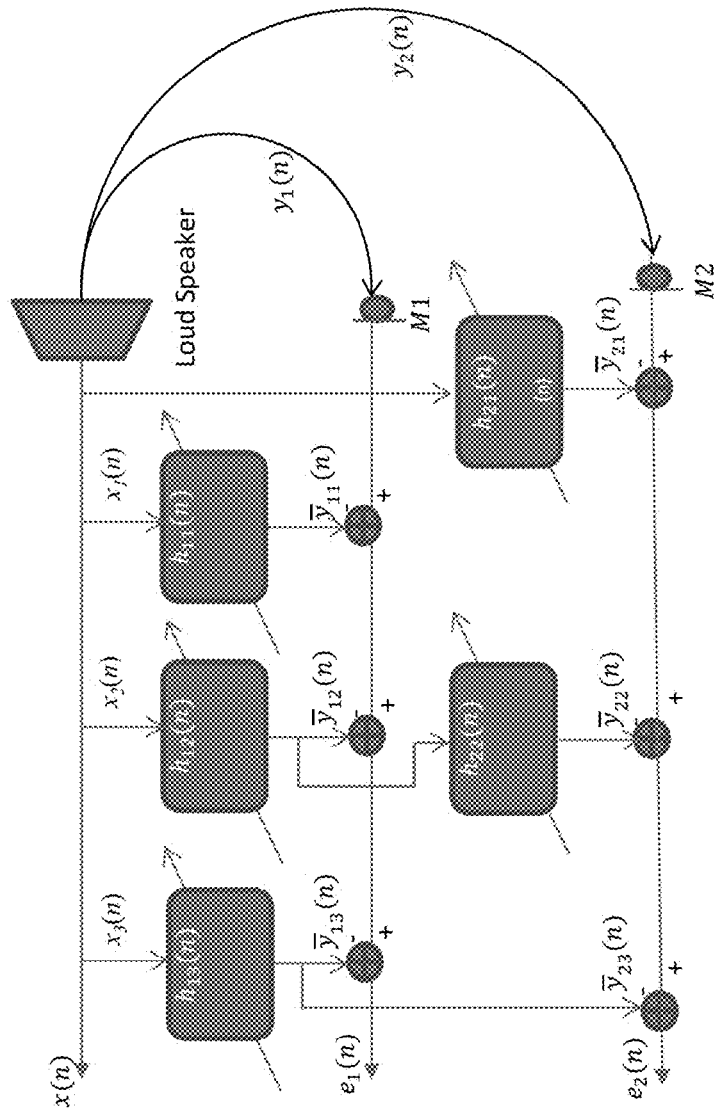
FIG. 6 is a flow diagram illustrating a predictive conventional acoustic echo canceller (AEC-P) in a time domain, according to an exemplary embodiment.

In comparison, FIG. 6 illustrates a predictive AEC (AEC-P) according to embodiments in a time domain. Similarly to FIG. 5, $x(n)$ refers to n'th sample value of the AEC reference signal; $y_i(n)$ refers to n'th sample value of the echo signal captured at microphone $M_i$; and $e_i(n)$ refers to n'th sample value of the residual error signal at microphone $M_i$. Differently from the conventional approach, however, the reference signal $x(n)$ may be partitioned into multiple sectioned reference signals, such as an initial taps section reference signal $x_1(n)$, a middle section reference signal $x_2(n)$, and a tail section reference signal $x_3(n)$, each comprising a respective number of samples (e.g., tap numbers) of the reference signal $x(n)$ In AEC-P, sections of room impulse response of echo are predicted by multiple filters respectively. $h_{1j}(n)$ refers to sectioned RIR filter for primary microphone $M_1$, where j is the section number $j\epsilon(1,2,3)$. $\bar{y}_{ij}(n)$ refers to the n'th sample value of the predicted echo signal for microphone $M_i$ at the jth section. In particular, $\bar{y}_{1j}(n)=x(n)\circledast h_{1j}(n)$; $j\epsilon(1,2,3)$. In other words, the echo for microphone $M_1$ is split into three sections (by, e.g., tap numbers), which are predicted by three filters. In some embodiments, one or more of the three filters may be a conventional full-complexity AEC filter.

$\bar{y}_{1j}(n)$ refers to the n'th sample value of the predicted echo signal for primary microphone $M_1$ at the jth section (also referred to as sectioned primary predicted echo signals). In other words, $y_{1j}(n)$ corresponds to the sectioned primary predicted echo signals, which may include an initial taps section primary predicted echo signal, a middle section primary predicted echo signal, and a tail section primary predicted echo signal. Thus, each of the predicted echo signals $\bar{y}_{1j}(n)$ is used to cancel a corresponding section of the echo signal $y_1(n)$ captured by microphone $M_1$.

$h_{2j}(n)$ refers to sectioned RIR filter for secondary microphone $M_2$, where j is the section number $j\epsilon(1,2)$. $\bar{y}_{2j}(n)$ corresponds to the sectioned secondary predicted echo signals, which may include an initial taps section secondary predicted echo signal, a middle section secondary predicted echo signal, and a tail section secondary predicted echo signal.

In some embodiments of AEC-P such as that shown in FIG. 6, the outputs of the RIR $h_{1j}(n)$ of primary microphone $M_i$ can be used to reduce complexity of performing echo cancellation of secondary microphone $M_2$. For example, $h_{21}(n)$ filter corresponds to the section 1 (initial taps section) shown in FIG. 3; $h_{22}(n)$ filter corresponds to the section 2 (mid section) shown in FIG. 3. As shown in the example of FIG. 6, the section 3 (tail section such as room reverberation) of the primary predicted echo signal $\bar{y}_{13}(n)$ for microphone $M_i$ is directly reused or copied for use as the section 3 of the secondary predicted echo signal $\bar{y}_{23}(n)$ for microphone $M_2$, i.e., $\bar{y}_{23}(n)=\bar{y}_{13}(n)$.

In the section 2 (mid section), the primary predicted echo signal $\bar{y}_{12}(n)$ for microphone $M_i$ is used as the input of the filter $h_{22}(n)$, (also referred to as relative acoustic echo correlation filter), to generate the section 2 of the secondary predicted echo signal $\bar{y}_{22}(n)$ for microphone $M_2$, $\bar{y}_{22}(n)=\bar{y}_{12}(n)\circledast h_{22}(n)$. This is referred to as partial prediction, because the filter $h_{22}(n)$ performs the prediction for microphone $M_2$ based on the primary predicted echo signal section $\bar{y}_{12}(n)$ for microphone $M_1$.

A separate filter $h_{21}(n)$ is used to generate the section 1 (initial taps section) of the secondary predicted echo signal $\bar{y}_{21}(n)$ for microphone $M_2$, $\bar{y}_{21}(n)=x(n)\circledast h_{21}(n)$. Each of the secondary predicted echo signals $\bar{y}_{2j}(n)$ is used to cancel a corresponding section of the secondary echo signal $y_2(n)$ captured by microphone $M_2$.

Figure 7:
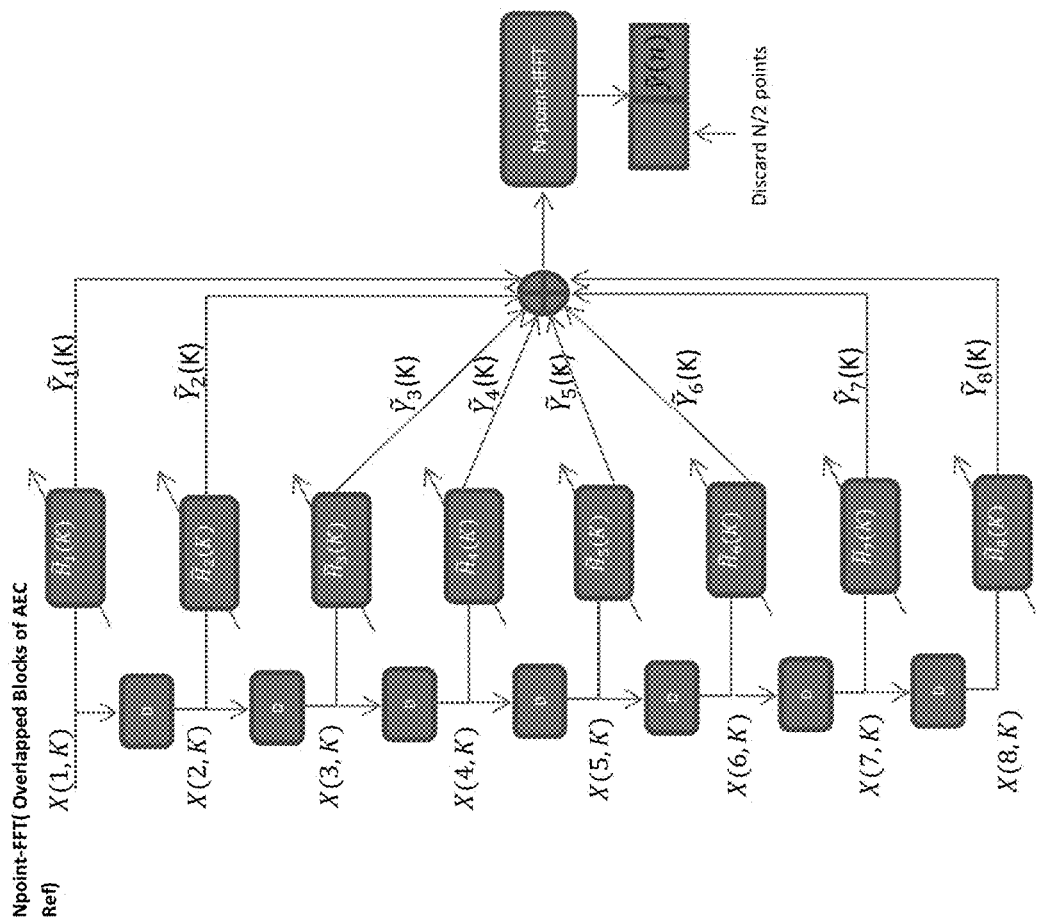
FIG. 7 illustrates a multidelay block frequency domain adaptive filter (MDF) for AEC, according to an exemplary embodiment.

In some embodiments, the AEC-P may be performed in either time domain or in frequency domain. For example, multidelay block frequency domain adaptive filter (MDF) can be used in AEC-P in frequency domain. FIG. 7 illustrates a multidelay block frequency domain adaptive filter (MDF) for AEC. As shown in FIG. 7, the AEC reference signal is converted (by, e.g., fast Fourier transform (FFT)) into blocks $X(m,K)$, wherein $m\epsilon(1,2,3,\ldots,M)$ refers to the number of branches or number of delay elements in MDF. $\tilde{H}_m(K)$ refers to an adaptive filter in the frequency domain, where $K\epsilon(1,2,3,\ldots,N)$ is the frequency bin index. $N/2$ is the input frame size. A combination of the adaptive filters $\tilde{H}_m(K)$ corresponds to an AEC filter.

As results of the adaptive filters, $\tilde{Y}_m(K)$ refers to the predicted echo from each branch, where $m\epsilon(1,2,3,\ldots,M)$. $\tilde{Y}_m(K)$ from the branches are combined and converted (by, e.g., inverse fast Fourier transform (IFFT)) into an echo signal predicted by MDF in the time domain $\tilde{y}(n)$. In other words, $\tilde{y}(n)$ is calculated by:

$$\tilde{y}(n) = \text{last } \frac{N}{2} \text{ terms of } \left\{ FFT^{-1}\left[\sum_{m=1}^{M} X(m,K)\cdot \tilde{H}_m(K)\right]\right\}.$$

Then the predicted echo signal can be used for echo cancellation and calculating residual error function, as shown in FIG. 5.

Figure 8:
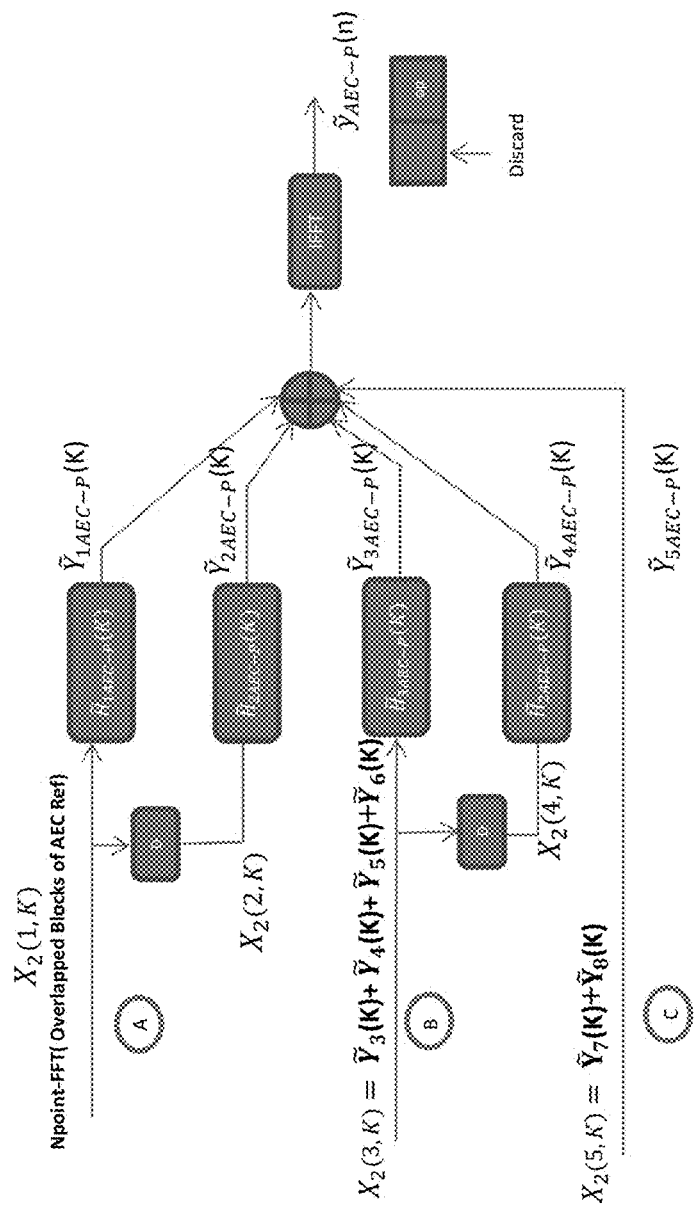
FIG. 8 illustrates a modified multidelay block frequency domain adaptive filter (MDF) for AEC-P, according to an exemplary embodiment.

FIG. 8 illustrates a modified multidelay block frequency domain adaptive filter (MDF) for AEC-P. The modified MDF approach takes advantage of results of the full complexity AEC performed for an adjacent microphone (e.g., primary microphone), and the AEC-P uses a combination of different sets of signal inputs to generate the predicted echo signal for the secondary microphone(s) in an efficient way. For example, the input signal sets are marked as A, B, and C in FIG. 8.

As discussed with respect to FIG. 6, AEC-P models the secondary echo by sectioning the room impulse response into three sections. To model these individual filter sections, three different input signal sets marked as A, B and C are used. Input signal set marked as "A" is directly from the secondary microphone's input signal (after conversion to the frequency domain by, e.g., FFT). Input signal set marked as "B" is a selective sum of predicted echo signal for the primary microphone (e.g., calculated based on an approach shown in FIG. 7). Input signal set marked as "C" is another selective sum of predicted echo signal (tail section) from the primary microphone.

Section 1 (input signal set "A") is for modeling direct echo and initial reflections. In some embodiments as illustrated in FIG. 8, AEC-P may use two 128-tap filters to model the direct echo and initial reflections. These filters are represented as $\tilde{H}_{1AEC-P}(K)$ and $\tilde{H}_{2AEC-P}(K)$, (collectively corresponding to filter $h_{21}(n)$ in FIG. 6), where K represent frequency indices, $K\epsilon(1,2,3, \ldots, N)$. N/2 is the input frame size. In the embodiments illustrated in FIG. 8, two filter sets are used, however, any number of filters can be used for each pair of a primary microphone and a secondary microphone.

$X_2(1,K)$ refers to the N-point FFT of overlapped input signal of the present and past frame. $X_2(2,K)$ refers to the delayed version of $X_2(1,K)$ obtained from frequency delay line (FDL) (as shown by D in FIG. 8).

Section 2 (input signal set "B") is the mid section for partial prediction. The filters for the mid sections are represented by $\tilde{H}_{3AEC-P}(K)$ and $\tilde{H}_{4AEC-P}(K)$, (collectively corresponding to filter $h_{22}(n)$ in FIG. 6), where K represent frequency indices, $K\epsilon(1,2,3, \ldots, N)$. N/2 is the input frame size.

In some embodiments, the mid sections have two high-level design choices. For the input signal, a sum of predicted echo signals for the primary microphone $\tilde{Y}_{n1}(K)$ to $\tilde{Y}_{n2}(K)$ can be used where, n1 is the design choice based on the signals used in the previous Section 1 (2 in this example) and n2 chosen such that n1<n2<=number of primary AEC sections (8 in this example). In some embodiments as illustrated in FIG. 8, and where the total number of sections is 8, a sum of signals from $\tilde{Y}_3(K)$ to $\tilde{Y}_6(K)$ is used. (i.e. n1=3 and n2=6) $X_2(3, K)=\tilde{Y}_3(K)+\tilde{Y}_4(K)+\tilde{Y}_5(K)+\tilde{Y}_6(K)$. $X_2(4,K)$ is a delayed version of $X_2(3,K)$. This choice of n1 and n2 may be guided by analyzing the impulse response of the device under test.

A number of filters used in modeling the mid section is another design choice, based on an optimized balance between performance and complexity. In some embodiments illustrated in FIG. 8, the design choice is two filters, e.g., $\tilde{H}_{3AEC-P}(K)$ and $\tilde{H}_{4AEC-P}(K)$ are used. In some other embodiments, any number of filters can be used for each pair of a primary microphone and a secondary microphone.

Section 3 (input signal set "C") is for modeling the tail section. After making the design choice for parameters "n1" and "n2," there is no other design choice as such to make in modeling the tail section. The predicted echo for the primary microphone, e.g., $\tilde{Y}_{n2+1}(K)$ to $\tilde{Y}_8(K)$ (where 8 is the total number of primary sections) is directly used in modeling section 3. $X_2(5,K)=\tilde{Y}_7(K)+\tilde{Y}_8(K)$. Thus, $\tilde{Y}_{5AEC-P}(K)$ corresponds to the signal $\bar{y}_{23}(n)$ in FIG. 6.

As results of the adaptive filters, $\tilde{Y}_{mAEC-P}(K)=X_2(m,K)*\tilde{H}_{mAEC-P}(K)$ refers to the predicted echo from each branch of each section. $\tilde{Y}_{m\ AEC-P}(K)$ are combined and converted (by, e.g., IFFT) into a predicted echo signal in the time domain $\tilde{y}_{AEC-P}(n)$. In other words, $\tilde{y}_{AEC-P}(n)$ is calculated by:

$$\tilde{y}_{AEC-P}(n) = \text{last } \frac{N}{2} \text{ terms of } \left\{ FFT^{-1}\left[\sum_{m=1}^{M} \tilde{Y}_{mAEC-P}(K)\right]\right\};$$

where $n\epsilon(1,2,3, \ldots, N/2)$, $K\epsilon(1,2,3, \ldots, N)$, N/2 is the input frame size, and M=5 in the embodiments illustrated in FIG. 8. (M may be any integer in other embodiments.) The filter coefficients may be updated iteratively using, e.g., block NLMS approach.

Figure 9:
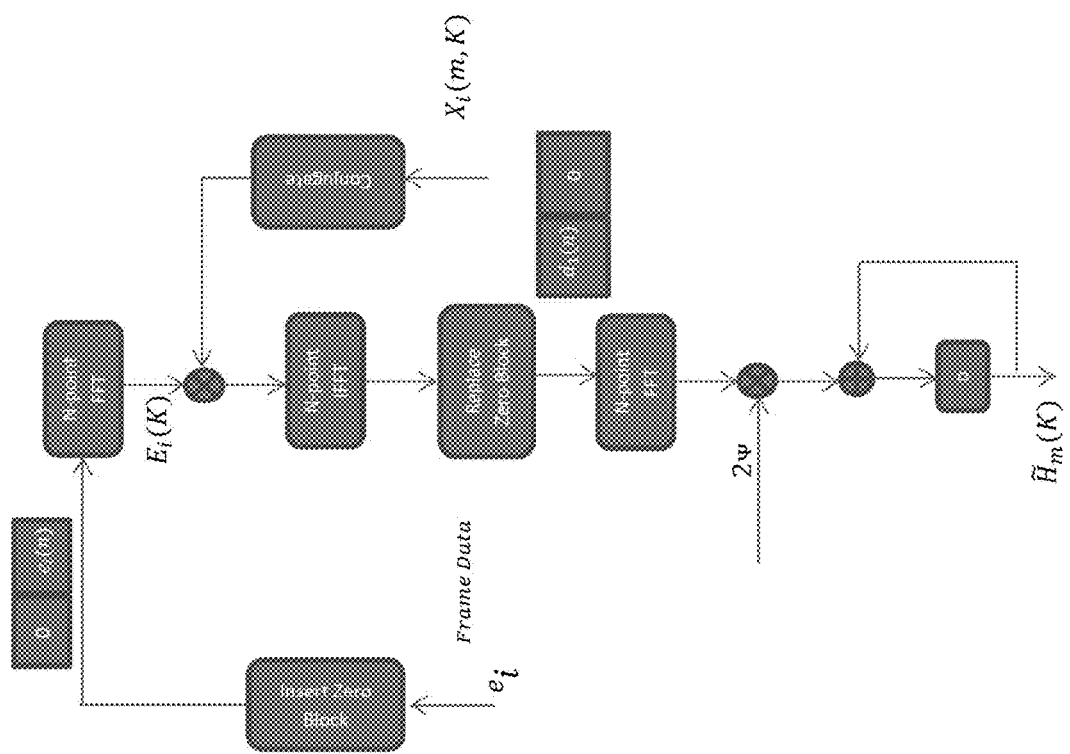
FIG. 9 is a flow diagram illustrating a process of iteratively updating filters for echo prediction, according to an exemplary embodiment.

In some embodiments, the filters of the AEC-P may be iteratively updated. FIG. 9 illustrates a sample process of iteratively updating filters. As shown in FIG. 9, the filter is updated by:

$$\tilde{H}_m(K)_{updated}=\tilde{H}_m(K)+2*\Psi*X_i(m,K)*E_i(K);$$

where $\Psi=G/SUM(X_i(m,K)*X_i(m,K))$. G is a convergence coefficient of, e.g., 0.01.

In FIG. 9, $e_i^{Frame\ Data}$ refers to the residual error vector after echo cancellation for the ith microphone. The residual error vector contains error samples $e_i(1)$ to $e_i(N/2)$ for a given frame of operation which is padded and provided to a N-point FFT as shown in FIG. 9. $X_i(m,K)*E_i(K)$ is the correlation term in the update equation, which is efficiently computed as shown in the block diagram of FIG. 9 and then fed to a serial chain of an N-point IFFT, a replace zero block and an N-point FFT to maintain the frequency domain representation. In some embodiments as shown in FIG. 9, a filter update control logic may govern the final update of filter coefficients of $\tilde{H}_m(K)$.

Figure 10:
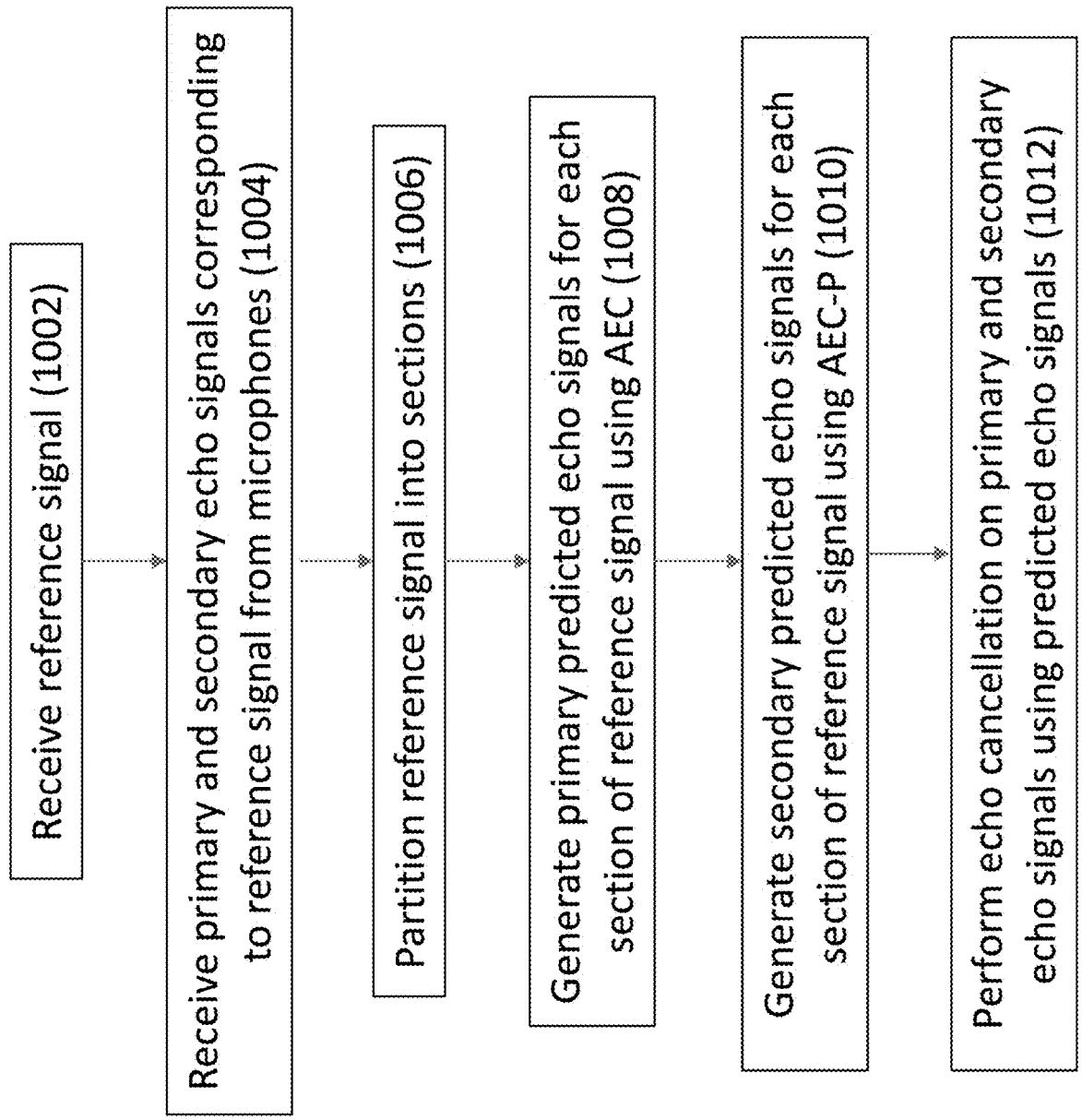
FIG. 10 is a flowchart illustrating an example primary and secondary microphone echo cancellation methodology according to embodiments.

FIG. 10 is a flowchart illustrating an example acoustic echo cancellation methodology according to embodiments.

As shown in FIG. 10, in block 1002 a reference signal is received, such as x(n) in FIG. 6, which is to be provided for output or playback as an audio signal by a loudspeaker in the near end environment.

In block 1004, and in an example where the microphones are comprised of primary and secondary pairs, the echo signals from the microphones corresponding to the reference signal are received. These can include the primary and secondary echo signals $y_1(n)$ and $y_2(n)$ such as shown in FIG. 6.

In block 1006, the reference signal is partitioned into sections, such as the initial, middle and tail sections shown in FIG. 6. As further described in connection with that example and illustrated in FIG. 3, if the reference signal contains 1024 samples (corresponding to 1024 taps of the RIR), the first 256 samples are used for the initial section, the second 512 samples are used for the middle section, and the final 256 samples are used for the tail section.

In block 1008, primary predicted echo signals for the primary microphone are generated for each section of the reference signal, for example using a 256 tap full-complexity AEC filter for the initial and tail sections of the reference signal, and a 512 tap full-complexity AEC filter for the middle section of the reference signal.

In block 1010, secondary predicted echo signals are generated for each section of the reference signal using AEC-P. As shown in the examples of FIGS. 6 and 8, a conventional 256-tap full complexity AEC filter may be used to generate the secondary predicted echo signal for the initial section of the reference signal. For the middle section of the reference signal, the predicted echo signal from the primary channel is used as an input for the secondary channel and a modified 256-tap MDF filter with reduced complexity is used to generate the secondary predicted echo signal for the middle section. The 256-tap output from the primary predicted echo signal for the tail section may be directly used as the secondary predicted echo signal for the tail section.

In block 1012, the primary predicted echo signals from AEC are used to remove echo from the signal from the primary microphone and the secondary predicted echo signals from AEC-P are used to remove echo from the signal from the secondary microphone.

In some embodiments, a comparison of echo cancellation performances between conventional AEC and disclosed AEC-P can be conducted. The comparison can be conducted by using, e.g., the device including 4 pairs of primary and secondary microphones as illustrated in FIG. 4. In some embodiments, the signal sampling rate can be 16 kHz. Different types of acoustic signals such as speech, music and white noise are tested. For the primary microphones, a tap length of 1024 can be used. For the secondary microphones, the tap lengths of 256 and 256 may be used for the initial tap section and the mid section respectively. The performances of echo cancellation may be quantified by echo return loss enhancement (ERLE) metric, which quantifies the amount of echo signal loss achieved by the echo cancellation filter.

FIG. 11 illustrates a comparison of echo cancellation performances between AEC and AEC-P for white noise signals. As shown in FIG. 11, the performances of AEC-P for secondary microphones are comparable to the performances of corresponding AEC. The differences of ERLE between AEC and AEC-P are from 2.93 dB to 3.85 dB, which equates to about 20% degradation. Degradation less than about 30% is generally considered acceptable.

FIG. 12 illustrates a comparison of echo cancellation performances between AEC and AEC-P for music signals. As shown in FIG. 11, the differences of ERLE between AEC and AEC-P are small, from 0.61 dB to 3.24 dB.

FIG. 13 illustrates a comparison of echo cancellation performances between AEC and AEC-P for speech signals. As shown in FIG. 12, the differences of ERLE between AEC and AEC-P are small, from 3.46 dB to 4.21 dB.

FIG. 14 illustrates a complexity analysis for AEC and AEC-P. As shown in FIG. 13, while an exemplary AEC involves 117504 arithmetic operations; a corresponding AEC-P involves 64000 arithmetic operations, corresponding to a 45.53% reduction of computational complexity.

As used herein, the singular terms "a," "an," and "the" may include plural referents unless the context clearly dictates otherwise. Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A method for echo cancellation, comprising:
   receiving a reference signal;
   receiving a primary echo signal from a primary microphone and a secondary echo signal from a secondary microphone corresponding to the reference signal;
   partitioning the reference signal into a plurality of sectioned reference signals, wherein each of the plurality of sectioned reference signals corresponds to a respective number of filter taps;
   generating a plurality of sectioned primary predicted echo signals for the primary microphone by processing the sectioned reference signals using an acoustic audio canceller (AEC);
   generating a plurality of sectioned secondary predicted echo signals for the secondary microphone by processing the sectioned reference signals using a predictive acoustic audio canceller (AEC-P), wherein the AEC-P generates at least one of the sectioned secondary predicted echo signals based on a corresponding sectioned primary predicted echo signal; and
   performing echo cancellation for the secondary microphone by removing the sectioned secondary predicted echo signals from the secondary echo signal.

2. The method of claim 1, wherein the AEC-P generates the plurality of sectioned secondary predicted echo signals by using echo filters with different tap lengths.

3. The method of claim 2, wherein the AEC-P generates at least one of the sectioned secondary predicted echo signals by applying an echo filter with inputs including a corresponding sectioned primary predicted echo signal.

4. The method of claim 1, wherein the AEC-P generates at least one of the sectioned secondary predicted echo signals by re-using a corresponding sectioned primary predicted echo signal.

5. The method of claim 1, further comprising:
   performing echo cancellation for the primary microphone by removing the sectioned primary predicted echo signals from the primary echo signal.

6. The method of claim 1, wherein the plurality of sectioned reference signals includes an initial taps section reference signal, a middle section reference signal, and a tail section reference signal;
   wherein the plurality of sectioned primary predicted echo signals includes an initial taps section primary predicted echo signal, a middle section primary predicted echo signal, and a tail section primary predicted echo signal; and
   wherein the plurality of sectioned secondary predicted echo signals includes an initial taps section secondary predicted echo signal, a middle section secondary predicted echo signal, and a tail section secondary predicted echo signal.

7. The method of claim 6, wherein the initial taps section reference signal, the middle section reference signal, and the tail section reference signal respectively correspond to an initial taps section, a middle section, and a tail section that are defined based on respective filter tap numbers for a room impulse response (RIR).

8. The method of claim 6, wherein the AEC-P generates the tail section secondary predicted echo signal by reusing the tail section primary predicted echo signal.

9. The method of claim 6, wherein the AEC-P generates the middle section secondary predicted echo signal by using an echo filter with inputs including the middle section primary predicted echo signal.

10. The method of claim 9, wherein the echo filter of the AEC-P for the middle section has a reduced tap length compared to filters of the AEC.

11. The method of claim 2 wherein one or more of the echo filters is a multidelay block frequency domain adaptive filter (MDF).

12. The method of claim 2, wherein one or more of the echo filters is a time domain filter.

13. The method of claim 6, wherein the AEC-P generates the initial taps section secondary predicted echo signal by using an echo filter with inputs including the initial taps section reference signal.

14. A method for echo prediction, comprising:
receiving a primary echo signal collected from a primary microphone and a secondary echo signal collected from a secondary microphone, corresponding to a reference signal that is provided for rendering into an audio signal by a speaker;
partitioning the reference signal into a plurality of sectioned reference signals;
generating a plurality of sectioned primary predicted echo signals based on the sectioned reference signals of an acoustic audio canceller (AEC);
generating a plurality of sectioned secondary predicted echo signals respectively by echo filters of a predictive acoustic audio canceller (AEC-P) based on the sectioned reference signals, wherein at least one of the sectioned secondary predicted echo signals is generated by one of the echo filters of AEC-P using a corresponding sectioned primary predicted echo signal as input, and wherein each of the respective echo filters has a different tap length; and
cancelling echo for the secondary microphone by combining the sectioned secondary predicted echo signals with the secondary echo signal.

15. The method of claim 14, wherein the AEC-P generates a tail section secondary predicted echo signal of the sectioned secondary predicted echo signals by re-using a tail section primary predicted echo signal of the sectioned primary predicted echo signals generated by the AEC.

16. The method of claim 14, wherein the AEC-P generates a middle section secondary predicted echo signal of the sectioned secondary predicted echo signals by using an echo filter with outputs including a middle section primary predicted echo signal of the sectioned primary predicted echo signals processed by the AEC.

17. The method of claim 15, wherein the sectioned secondary predicted echo signals include an initial taps section secondary predicted echo signal corresponding to direct echo from the speaker or initial acoustic reflections from nearby objects.

18. The method of claim 14, wherein one or more of the echo filters is a multidelay block frequency domain adaptive filter (MDF).

19. The method of claim 14, wherein one or more of the echo filters is a time domain filter.

20. An electronic device with echo cancellation, comprising;
a speaker configured to render a reference signal for output as an audio signal;
a primary microphone configured to collect a primary echo signal corresponding to the reference signal;
a secondary microphone configured to collect a secondary echo signal corresponding to the reference signal; and
a processor configured to perform a method including:
partitioning the reference signal into a plurality of sectioned reference signals;
generating a plurality of sectioned primary predicted echo signals for the primary microphone by processing the sectioned reference signals by an acoustic audio canceller (AEC);
generating a plurality of sectioned secondary predicted echo signals for the secondary microphone by processing the sectioned reference signals by a predictive acoustic audio canceller (AEC-P), wherein the AEC-P generates at least one of the sectioned secondary predicted echo signals based on a corresponding sectioned primary predicted echo signal; and
performing echo cancellation by removing the sectioned primary predicted echo signals from the primary echo signal and removing the sectioned secondary predicted echo signals from the secondary echo signal.

* * * * *